United States Patent Office 2,904,459
Patented Sept. 15, 1959

2,904,459

NON-CORROSIVE SOLDERING FLUX FOR ELECTRICAL APPLICATION

Tadashi Kubota, Tokyo-to, Japan, assignor to Tamura Works, Ltd., Tokyo-to, Japan, a corporation of Japan No Drawing. Application March 18, 1957
Serial No. 646,565

Claims priority, application Japan March 22, 1956

9 Claims. (Cl. 148—23)

The present invention relates to a soldering flux for electrical application, characterized in that the flux contains amine salts of abietic acid as an essential constituent.

It is a general practice to use soldering fluxes for connecting wires electrically and other electrical applications. The object of using the fluxes is to obtain a chemically clean surface by removing oxides, etc., present, on the surface of metals and to cover the cleaned surface with fluxes for protecting it from oxidation, for reinforcing the strength of the joint between the metal to be joined and the solder. Particularly, in the fluxes used for connecting wires electrically, it is very important that the residue remaining after soldering has no corrosive effect, and moreover, has an electric insulating property.

Now, the ideal properties that the soldering fluxes for electrical applications have to possess are as follows:

(1) Copper, tin, nickel, brass, cadmium, unichrome, silver, chromium and other similar metals, or iron or iron plate with any of the aforementioned metals can easily be soldered thereby.

(2) No corrosive property, i.e., it should meet perfectly the requirements of the corrosive property determining test specification (AN–S–62 MIL–S–6872).

(3) Excellent electrical insulating property, and the residue of the flux after soldering serves fully as an insulating film.

(4) Non-oxidizing property, i.e., unfavorable after effects, that the soldering residue is oxidized by oxygen in the air, and with the result a corrosive or electrical conductive substance is produced, should be avoided.

(5) No hygroscopic property or water absorbing property, i.e., it should be avoided that, the residue after soldering has itself no corrosive nor electrical conductive property, but due to its hygroscopic or water-absorbing property its insulating ability would be lowered, resulting in corrosion on the surface of metal.

Usually, rosin has long been used as a soldering flux for electrical applications, having substantially all the above-said properties for fluxes and being non-corrosive and insulating. Therefore, rosin is now generally used as an excellent non-corrosive flux.

However, rosin is still insufficient in view of the uneasiness in soldering, particularly displaying no sufficient cleaning action on nickel and its alloys, unichrome plated surfaces, cadmium or its plated surface, clean iron surfaces or zinc plated surfaces, etc. Especially, on the surfaces of those nickel, nickel plated metal, brass, unichrome and cadmium plated iron plates etc., elapsed many days after the manufacture, rosin has no sufficient cleaning action as the flux for soldering.

What has been described above is an insufficient and largest disadvantage in practice of soldering, to use rosin as non-corrosive flux.

The reason why rosin acts effectively as flux, is due to the action of abietic acid contained therein. However, commercial rosin contains only approximately 25 to 30% of abietic acid, the remaining part of which is constituted of complicated resinous matter containing optical isomers of abietic acid and diterpene homologues. Thus, if such rosin is used as flux, it would be inevitable to accompany such defects as referred to above.

The present invention provides a novel non-corrosive soldering flux, the effective constituent of which are stable amine salts as obtained by causing basic amines to react with carboxyl group of abietic acid of rosin.

Namely, according to the present invention, rosin is treated with hydrochloric acid to obtain isomerized rosin, with which diethylene-triamine, dibutylamine, diamylamine, etc., are caused to react to obtain all sorts of amine salts of abietic acid, and said amine salts being utilized as essential constituent of the soldering flux.

Usual fluxes blended with rosin or principally with rosin, are mere mixtures of rosin and other chemical compound, and the reactivity of such mixtures are imperfect. However, according to the present invention, the essential constituent of the flux is in purified state, which is caused by reacting purified principal constituent of rosin with amines, separating and purified.

Therefore, the flux is not only stable but also its cleaning action is strong and the residue of the flux after soldering shows no corrosive property. Moreover, the insulating property of the flux is excellent and it is an ideal flux for applications in electrical distributing wires.

The soldering flux of this invention facilitates the soldering operation, and shows sufficient fluidity at the soldering temperature, thus enabling enough spreading, as well as a good coating action on the clean surfaces, which causes perfect and permanent soldering between the metal and the solder. The residue resulting from the soldering operation is an entirely neutral resinous substance, which has no corrosive as well as hygroscopic property and having non-oxidising and electric insulating properties. Consequently, it is not particularly needed to remove the residue after soldering and the flux has no poisonous action physiologically, while handling, thus showing remarkably high practical effect.

Now, the soldering fluxes according to this invention will be described with reference to examples as follows.

(I) LIQUID FLUX

The liquid flux is used in the following cases, that is, when it is applied by a brush or by means of a sprayer on the surface of the metal to be soldered, over which the solder is caused to flow, or when the flux is mixed with pulverized solder to make a high fluidity paste, which is then applied on the metal to be soldered and heated to accomplish the soldering at once.

*Example 1*

The flux under Example 1 has a composition as shown below and is suitable for the soldering of metals such as copper, brass, iron, zinc, tin, cadmium, nickel, etc., or of the surfaces plated with such metals, particularly imparting remarkable workability and corrosive resistance when it is applied for the soldering of those sheet metals, while the soldering residue is extremely small in quantity and the spreading of the solder is quite satisfactory.

| | Parts |
|---|---|
| Neutral rosin compound A (containing 40% abietic acid-diethylene-triamine salt) | 50 |
| Neutral rosin compound B (containing 40% abietic acid-dibutyl-amine salt) | 10 |
| Methanol (over 95%) | 250 |
| Anti-oxidant (ditertiary-butylcresol) | 1 |
| Surface active agent (alkyl-arylsulfonate) | 1 |

(N.B. When above composition becomes higher in the concentration due to evaporation of methanol while in use, suitable addition of methanol is necessary to make for further application.)

*Example 2*

The flux of the following composition is obtained by mixing powdered solder metal to the flux equivalent to that of Example 1 and has similar applications as the flux of Example 1, and for the sake of containing the solder, the soldering operation is simple, and particularly suitable for the soldering and joining of broad metal surfaces.

| | Parts |
|---|---|
| Neutral rosin compound A (containing 40% abietic acid-diethylene-triamine salt) | 15 |
| Ditto compound B (containing 40% abietic acid-dibutylamine salt) | 5 |
| Ditto compound C (containing 40% abietic acid-diamylamine salt) | 10 |
| Solder (zinc 50%:tin 50%) powder (250 mesh) | 80 |
| Methanol (over 95%) | 60 |
| Anti-oxidant (same as in Example 1) | 1 |
| Surface active agent (same as in Example 1) | 1 |

(N.B. Same as in Example 1.)

Among the components of liquid flux, the abietic acid-diamyl-amine salt behaves to prevent the abietic acid-dibutylamine salt from hydrolysis, which effect is especially remarkable to the hydrolytic reaction due to the acid in an alcoholic solution. However, there is no possibility for such salts to reach a fixed equilibrium in the hydrolysis under all the conditions in the practical range of applications of flux. In other words, it may be said that the salt is most stable. The hydrolysis due to the moisture and carbonic acid, etc., in the air is not seen, because the salt is a resinous solid material and thus insoluble in water. The hydrolysis of the present salt does not occur, except when it is hydrolyzed by non-organic acid in a solvent, especially in an ethanol solution; and no decomposition of this salt takes place during storing due to its stability.

The anti-oxidant is added to prevent the diterpene-nucleus and a long alkyl chain of amine salt from oxidation and thus gives a reservation property for a long period of time.

(II) PASTY FLUX

The pasty flux is preferably used in a local soldering, chiefly for the soldering of connecting wires etc., for electrical appliances, because of its easiness in the handling.

*Example 1*

| | Parts |
|---|---|
| Neutral rosin compound A (containing 40% abietic acid-diethylene-triamine salt) | 10 |
| Neutral rosin compound B (containing 40% abietic acid-dibutylamine salt) | 5 |
| Organic resinous base material (polytetrapropylene: molecular weight 1100) | 20 |
| Gasoline or hydrocarbon oil | 15 |
| Anti-oxidant (similar as in the case with the liquid flux) | 0.1 |

*Example 2*

| | Parts |
|---|---|
| Neutral rosin compound A (containing 40% abietic acid-diethylenetriamine salt) | 15 |
| Neutral rosin compound B (same as before cited example) | 5 |
| Neutral rosin compound C (same as before cited example) | 3 |
| White vaseline | 30 |
| Liquid paraffine | 5 |

(III) SOLID FLUX

The solid flux is used for the manufacture of cored solder. Therefore, this flux is solid at room temperature and has some flexibility.

The practical examples thereof are as follows:

*Example 1*

The flux has an excellent welding ability towards a solder of Sn:pb=50:50 and simultaneously the residue of the flux after soldering has an excellent electric insulating property. It is of course non-corrosive neutral flux.

| | Parts |
|---|---|
| Neutral rosin compound A (same as before cited example) | 15 |
| Ditto compound B (same as before cited example) | 7 |
| Ditto compound C (same as before cited example) | 3 |
| Base material (commercial name: Picopayl, polytetrapropylene resin mol. weight: 1100) | 15 |
| Anti-oxidant (ditertiary-butylcresol) | 0.1 |

*Example 2*

| | Parts |
|---|---|
| Neutral rosin compound A | 20 |
| Ditto compound B | 10 |
| Ditto compound C | 5 |
| Rosin (pine resin) | 20 |
| Diphenylamine | 1 |
| Urea | 2 |

What I claim:

1. In a soldering flux for electrical application which contains rosin, the improvement wherein abietic acid in the rosin has been converted to at least one amine salt selected from the group consisting of abietic acid-diethylenetriamine salt, abietic acid-dibutylamine salt and abietic acid-diamylamine salt.

2. A soldering flux consisting essentially of rosin in which abietic acid is in the form of at least one abietic acid amine salt, methanol, anti-oxidant and surface active agent.

3. A soldering flux according to claim 2, wherein the abietic acid amine salt is selected from the group consisting of abietic acid-diethylene-triamine salt, abietic acid-dibutylamine salt and abietic acid-diamylamine salt.

4. A soldering flux consisting essentially of rosin in which abietic acid is in the form of at least one abietic acid amine salt, solder powder, methanol, anti-oxidant and surface active agent.

5. A soldering flux consisting essentially of rosin in which abietic acid is in the form of at least one abietic acid amine salt, organic resinous base material, anti-oxidant and a material selected from the group consisting of gasoline and hydrocarbon oil.

6. A soldering flux consisting essentially of rosin in which abietic acid is in the form of at least one abietic acid amine salt, white vaseline and liquid paraffin.

7. A soldering flux consisting essentially of rosin in which abietic acid is in the form of at least one abietic acid amine salt, antioxidant and a base material.

8. A soldering flux according to claim 7 wherein the base material is polytetrapropylene.

9. A soldering flux consisting essentially of rosin in which abietic acid is in the form of at least one abietic acid amine salt, rosin, diphenylamine and urea.

References Cited in the file of this patent

UNITED STATES PATENTS

| 1,444,946 | Brown | Feb. 13, 1923 |
| 1,709,542 | Raymond | Apr. 16, 1929 |
| 1,882,734 | Barber | Oct. 18, 1932 |
| 1,949,916 | McQuaid | Mar. 6, 1934 |